(12) United States Patent
Chen (10) Patent No.: US 10,681,193 B2
(45) Date of Patent: Jun. 9, 2020

(54) MOBILE TERMINAL

(71) Applicant: GUANGDONG OPPO MOBILE TELECOMMUNICATIONS CORP., LTD., Dongguan, Guangdong (CN)

(72) Inventor: Jia Chen, Dongguan (CN)

(73) Assignee: GUANGDONG OPPO MOBILE TELECOMMUNICATIONS CORP., LTD, Dongguan, Guangdong (CN)

( * ) Notice: Subject to any disclaimer, the term of this patent is extended or adjusted under 35 U.S.C. 154(b) by 0 days.

(21) Appl. No.: 16/144,981

(22) Filed: Sep. 27, 2018

(65) Prior Publication Data

US 2019/0116248 A1 Apr. 18, 2019

(30) Foreign Application Priority Data

Oct. 13, 2017 (CN) .................. 2017 1 09591994
Oct. 13, 2017 (CN) .................. 2017 2 1326003 U (51) Int. Cl.
*H04M 1/02* (2006.01)
*H04M 1/67* (2006.01)
*G06F 21/32* (2013.01)

(52) U.S. Cl.
CPC ....... *H04M 1/0237* (2013.01); *H04M 1/0264* (2013.01); *H04M 1/0279* (2013.01); *G06F 21/32* (2013.01); *H04M 1/67* (2013.01)

(58) Field of Classification Search
CPC .... H04M 1/0214; H04M 1/23; H04M 1/0247; H04M 1/0237; H04M 1/0235; H04M 1/0245; H04B 1/3833; G06F 1/1624
See application file for complete search history.

(56) References Cited

U.S. PATENT DOCUMENTS 5,201,069 A * 4/1993 Barabolak ............ H04B 1/3833
379/429
2004/0120552 A1* 6/2004 Borngraber ........ G07C 9/00158
382/115

(Continued)

FOREIGN PATENT DOCUMENTS

| CN | 101888419 A | 11/2010 |
| CN | 206506566 U | 9/2011 |
| CN | 104994190 A | 10/2015 |
| CN | 204906442 U | 12/2015 |

(Continued)

OTHER PUBLICATIONS

International Search Report and Written Opinion issued in corresponding International application No. PCT/CN2018/109902, dated Jan. 4, 2019 (10 pages).

(Continued)

*Primary Examiner* — San Htun
(74) *Attorney, Agent, or Firm* — Ladas & Parry, LLP (57) ABSTRACT

A mobile terminal includes a first body and a second body. The first body includes a main body portion, a first extension and a second extension connected to opposite sides of the main body portion. The first extension is provided with a first functional component and the second extension is provided with a second functional component. The second body is slidably stacked on the first body and selectively slide to a first position, a second position or a third position. The second body covers the main body portion, the first functional component and the second functional component at the first position, the second body exposes the first functional component at the second position, and the second body exposes the second functional component at the third position.

20 Claims, 10 Drawing Sheets

(56) References Cited

U.S. PATENT DOCUMENTS

| | | | |
|---|---|---|---|
| 2005/0124398 A1* | 6/2005 | Lee | H04B 1/38 455/575.4 |
| 2007/0128904 A1* | 6/2007 | Kang | H04M 1/0237 439/159 |
| 2007/0189583 A1* | 8/2007 | Shimada | G06K 9/00255 382/118 |
| 2008/0242381 A1* | 10/2008 | Hyun | H04M 1/0237 455/575.4 |
| 2008/0292144 A1* | 11/2008 | Kim | G06K 9/00604 382/117 |
| 2010/0273542 A1* | 10/2010 | Holman, IV | H04M 1/0237 455/575.4 |
| 2014/0085460 A1* | 3/2014 | Park | G06F 21/84 348/135 |

FOREIGN PATENT DOCUMENTS

| | | |
|---|---|---|
| CN | 106657456 A | 5/2017 |
| CN | 206364843 U | 7/2017 |
| CN | 207369088 U | 5/2018 |
| CN | 207369089 U | 5/2018 |
| EP | 1760996 A2 | 3/2007 |
| EP | 2040442 A1 | 3/2009 |
| EP | 2372982 A1 | 10/2011 |

OTHER PUBLICATIONS

European Search Report and Opinion issued in corresponding European application No. 18197988.1, dated Feb. 20, 2019 (8 pages).

* cited by examiner

MOBILE TERMINAL

CROSS-REFERENCE TO RELATED APPLICATION

This application claims priority to a Chinese application No. 201710959199.4 filed on Oct. 13, 2017, titled "MOBILE TERMINAL" and a Chinese application No. 201721326003.X filed on Oct. 13, 2017, titled "MOBILE TERMINAL". The entireties of the above-mentioned applications are hereby incorporated by reference herein.

TECHNICAL FIELD

The present disclosure relates to a technical field of electronic devices, and particularly to a mobile terminal.

BACKGROUND

With the rapid development of communication technology, smartphones are playing an increasingly important role in today's life, work and entertainment.

Screen-to-body ratio is one of the most important aspects of the smartphone, and is used generally to represent an area ratio of the display area of display screen to a front surface of the smartphone.

However, the screen-to-body ratio of the smartphone is designed relatively low nowadays. Generally, a low screen-to-body ratio may indicate a small display area, and therefore, resulting in a poor user experience.

SUMMARY

Embodiments of the present disclosure provide a mobile terminal.

In one embodiment, a mobile terminal may include a first body and a second body. The first body may include a main body portion, a first extension, a second extension, the first functional component and a second functional component. The first extension and the second extension are respectively connected to opposite sides of the main body portion. The first functional component is disposed on the first extension, and the second functional component is disposed on the second extension. The second body is slidably stacked on the first body. The second body can be selectively slide to a first position, a second position or a third position. When the second body is at the first position, the second body may cover the main body portion, the first functional component and the second functional component. When the second body is In one embodiment, a mobile terminal may include a first body and a second body. The first body may include a main body portion, a first extension and a second extension. The main body portion is connected between the first extension and the second extension. The second extension is provided with a functional component including at least one of a camera and a receiver. The second body is slidably stacked on the first body. After the second body slides from the second extension to the first extension relative to the first body, the functional component is exposed.

In one embodiment, a mobile terminal may include a first body and a second body. The first body may include a main body portion, a first extension, a second extension and a first functional component. The main body portion is connected between the first extension and the second extension, and the first functional component is disposed on the first extension. The second body is slidably stacked on the first body. The second body can be selectively slide to a first position or a second position. When the second body is at the first position, the second body covers the main body portion and the first functional component. When the second body is at the second position, the first functional component is exposed.

The above description is only an overview of the technical solution of the present disclosure, and in order to more clearly understand the technical means of the present disclosure, it can be implemented in accordance with the contents of the specification, and in order to the features and advantages of the present disclosure will become more apparent, the embodiments are specifically described below, and are described in detail below with reference to the accompanying drawings.

DETAILED DESCRIPTION OF PREFERRED EMBODIMENTS

In order to facilitate the understanding of the present disclosure, the present disclosure will be described more fully hereinafter with reference to the accompanying drawings. Preferred embodiments of the present disclosure is disclosure in the accompanying drawings. However, the disclosure can be embodied in many different forms and is not limited to the embodiments described herein. Rather, these embodiments are provided for a more thorough understanding of the disclosure of the present disclosure.

Unless otherwise defined, all technical and scientific terms used herein have the same meaning as commonly understood by one of ordinary skill in the art. The terms used in the description of the present disclosure is for describing the specific embodiments and are not intended to limit the disclosure.

The "communication terminal" (or simply "terminal") used in the present disclosure includes, but is not limited to, a device that is configured to connect via a wireline (such as via a public switched telephone network (PSTN), a digital subscriber line (DSL), a digital cable, a direct cable connection, and/or another data connection/network), and/or receive/transmit a communication signal via a wireless interface (e.g., for a cellular network, a wireless local area network (WLAN), a digital television networks such as DVB-H networks, a satellite networks, a AM-FM broadcast transmitters, and/or another communication terminal). Communication terminals that are arranged to communicate over a wireless interface may be referred to as "wireless communication terminals", "wireless terminals", and/or "mobile terminals". Examples of mobile terminals include, but are not limited to, satellite or cellular telephones, personal communication system (PCS) terminals that can combine cellular radiotelephone as well as data processing, faxing, and data communication capabilities, PDAs that may include radiotelephones, pagers, Internet/Intranet access, web browsers, notepads, calendars, and/or global positioning system (GPS) receivers, and conventional laptop and/or palmtop receivers or other electronic devices including radiotelephone transceivers.

Figure 1:
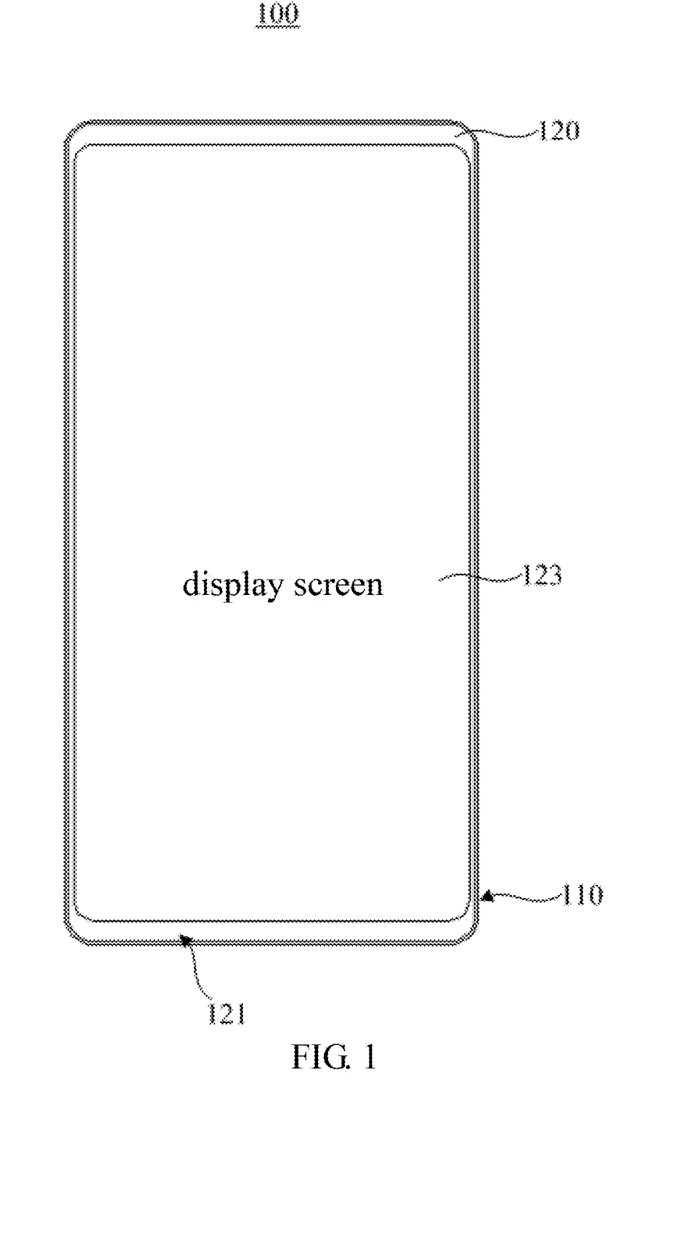
FIG. 1 is a schematic structural diagram of a view on a side of the second body of the mobile terminal in accordance with one embodiment of the present disclosure.

Referring to FIG. 1, the mobile terminal 100 provided in the illustrated embodiment may include a first body 110 and a second body 120. The second body 120 is slidably coupled to the first body 110. The state shown in FIG. 1 is that the second body 120 is stacked on the first body 110. In the illustrated embodiment, the first body 110 and the second body 120 are substantially equal in size. Therefore, the first body 110 is completely covered by the second body 120 from the view on a side of the second body 120. In the alternative embodiments, the size of the first body 110 may also be slightly larger or smaller than the size of the second body 120.

Figure 2:
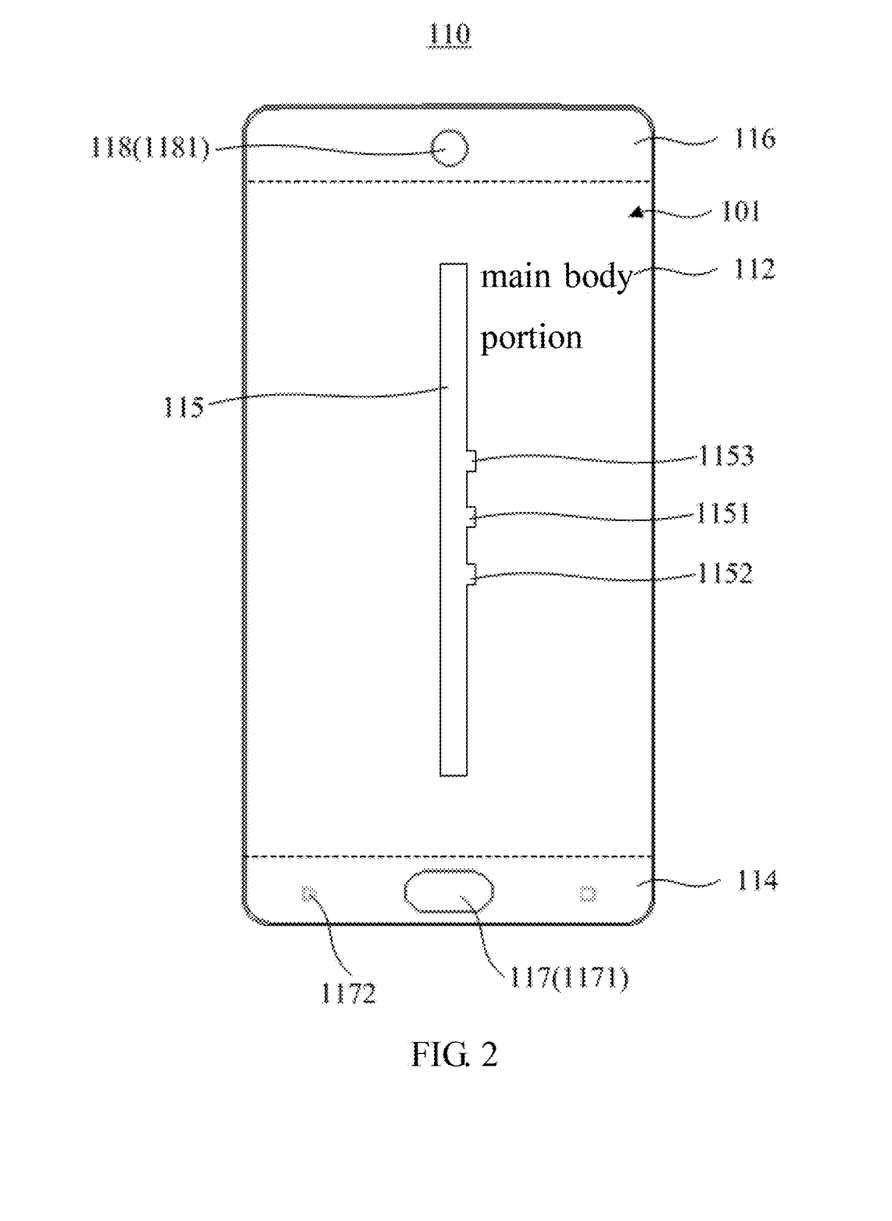
FIG. 2 is a schematic structural diagram of a view on a side of a first surface of the first body of the mobile terminal in accordance with one embodiment of the present disclosure.

Referring to FIG. 2, the first body 110 is mainly configured to carry components of the mobile terminal 100, such as a motherboard, a battery, or other functional components.

In the illustrated embodiment, the first body 110 may include a main body portion 112, a first extension 114, and a second extension 116. It should be noted that the division of the main body portion 112, the first extension 114, and the second extension 116 is only for convenience of description in the present disclosure. The first body 110 may be a one-piece structure including the body portion 112, the first extension portion 114, and the second extension portion 116.

The main body portion 112 is connected between the first extension 114 and the second extension 116. In the illustrated embodiment, the main body portion 112 is substantially rectangular. The first extension 114 and the second extension 116 are respectively disposed on opposite sides along the longitudinal direction of the main body portion 11. In the illustrated embodiment, the first extension 114 and the second extension 116 may also be respectively disposed on opposite sides along the width direction of the main body portion 112. The first extension 114 and the second extension 116 may be approximately equal in size, that is, the first extension 114 and the second extension 116 may be symmetrically arranged. It can be understood that, in the alternative embodiments, the first extension 114 can be smaller or larger than the second extension 116.

Figure 3:
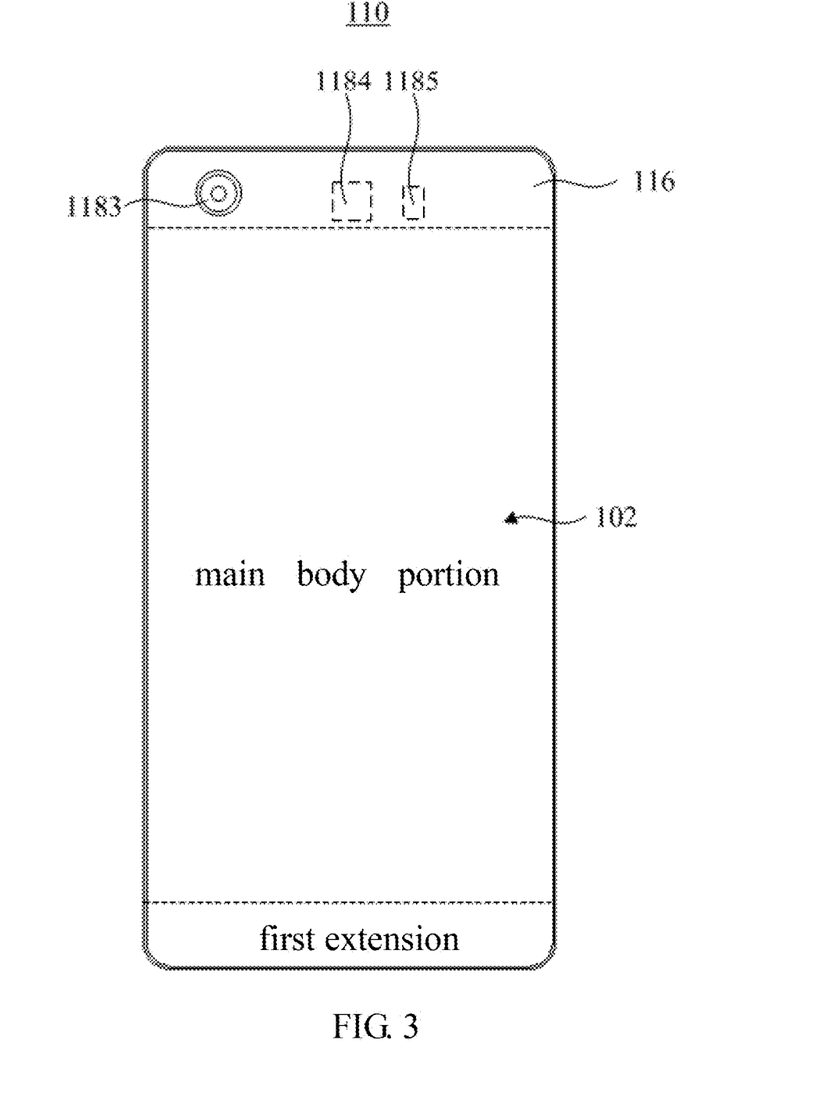
FIG. 3 is a schematic structural diagram of a view on a side of a second surface of the first body of the mobile terminal in accordance with one embodiment of the present disclosure.

Referring to FIG. 2 and FIG. 3 together, the first body 110 may have a first surface 101 and a second surface 102. The second surface 102 and the first surface 101 are respectively disposed on opposite sides of the first body 110. The second body 120 is slidably stacked on the first surface 101. The sliding of the second body 120 relative to the first body 110 can be implemented by, for example, but not limited to the cooperation of the sliding slot and the positioning protrusion. It can be understood that, other sliding structures that can realize sliding is also applicable.

In the illustrated embodiment, the first body 110 may include a first sliding engagement portion (for example, a sliding slot 115 as illustrated in the FIG. 2). The sliding slot 115 is disposed, for example, at the first surface 101 of the main body portion 112. The longitudinal direction of the sliding slot 115 is substantially parallel to the longitudinal direction of the main body portion 112, thereby a sliding direction of the second body 120 with respect to the first body 110 being substantially parallel to the longitudinal direction of the main body portion 112. Accordingly, the second body 120 may include a second sliding engagement portion that corporates with the first sliding engagement portion (for example, a positioning protrusion 125, referring to FIG. 4 and the description of the second body 120). The cooperation of the first sliding engagement portion and the second sliding engagement portion (such as the cooperation of the positioning protrusion 125 and the sliding slot 115), can make the second body 120 slide from the first extension 114 to the second extension 116 relative to the first body 110, or from the second extension 116 to the first extension 114.

In the alternative embodiments, the sliding slot may be disposed in the second body 120 and the positioning protrusion may be disposed on the first body 110. In some embodiment, the sliding of the second body 120 relative to the first body 110 may also be achieved by providing a slide rail between the first body 110 and the second body 120.

In the illustrated embodiment, the first body 110 may further include a first positioning portion 1151, a second positioning portion 1152, and a third positioning portion 1153. The second positioning portion 1152, the first positioning portion 1151, and the third positioning portion 1153 are sequentially arranged along the sliding direction of the second body 120 with respect to the first body 110. The first positioning portion 1151 is disposed substantially in the middle of the mobile terminal 100. The second positioning portion 1152 and the third positioning portion 1153 are respectively disposed on both sides of the first positioning portion 1151. The second positioning portion 1152 is closer to the first extension 114 than the third positioning portion 1153. The distance between the first positioning portion 1151 and the second positioning portion 1152 is approximately equal to the distance that the second body 120 slides from the second extension 116 to the first extension 114 relative to the first body 110. The distance between the first positioning portion 1151 and the third positioning portion 1152 is substantially equal to the distance that the second body 120 slides from the first extension 114 to the second extension 116 relative to the first body 110.

In the illustrated embodiment, the first positioning portion 1151, the second positioning portion 1152, and the third positioning portion 1153 may be, for example, positioning slots disposed on the first surface 101 and communicated with the sliding slot 115. Accordingly, the second body 120 is provided with a positioning block 126 that can selectively cooperate with the first positioning portion 1151, the second positioning portion 1152, or the third positioning portion 1153 (refer to FIG. 4). When the first positioning portion 1151, the second positioning portion 1152, and the third positioning block 1153 of the present embodiment are the positioning slots, the positioning block 126 disposed on the second body 120 is, for example, an elastic protruded column. The positioning block may be made of a thermoplastic elastomer. In addition, the positioning block 126 may also be an elastic cylindrical pin made of a rigid material.

When the second body 120 slides relative to the first body 110 until the positioning block 126 is engaged with the first positioning portion 1151, that is, when the elastic protruded column is disposed in the positioning slot of the first positioning portion 1151, the second body 120 can be positioned and fixed. Due to the elasticity of the protruded column, when a force acts on the second body 120, the positioning block 126 can be pushed out from the positioning slot of the first positioning portion 1151 and slid along the sliding slot 115. When the second body 120 slides relative to the first body 110 and the positioning block 126 slides into the positioning slot of the second positioning portion 1152, the second body 120 can be disposed and fixed again. Similarly, since the positioning block 126 is elastic, when a force acts on the second body 120, the positioning block 126 can be pushed out from the positioning slot of the first positioning portion 1151 and slid along the sliding slot 115. When the second body 120 slides relative to the first body 110 and the positioning block 126 slides to the third positioning slot 1153, the second body 120 can be disposed and fixed. It can be understood that the positioning block 126 can also be pushed out from the positioning slots of the second positioning portion 1152 and the third positioning portion 1153 and slide along the sliding slot 115 under the force acting on the second body 120.

The position of the positioning block 126 disposed in the second body 120 corresponds to the position of the first positioning portion 1151, so that when the first body 110 is completely covered by the second body 120 (as shown in FIG. 1). For example, when the first positioning portion 1151 is disposed in the middle of the mobile terminal 100, the positioning block 126 is also disposed in the middle of the mobile terminal. When the second body 120 slides relative to the first body 110 until the positioning block 126 is engaged with the first positioning portion 1151, as shown in FIG. 1, the first body 110 and the second body 120 are stacked, and the first body 110 can be completely covered by the second body 120.

In the alternative embodiments, the first positioning portion 1151, the second positioning portion 1152, and the third positioning portion 1153 may be elastic protruded column, and the positioning block 126 may be a positioning slot.

The first body 110 may further include a first functional component 117 disposed on the first extension 114. The first functional component 117 may include a fingerprint recognition module 1171. The fingerprint acquisition unit of the fingerprint recognition module 1171 may be exposed from the first surface 101 of the first body 110 at the first extension 114 so that the user can use the function of fingerprint recognition. It can be understood that the fingerprint recognition module 1171 may also be integrated with the primary key (iHome key).

In the illustrated embodiment, the first body 110 may further include other functional keys 1172, a return key or a menu key for example, disposed on the first surface 101 of the first body 110 at the first extension 114. In some embodiments, the fingerprint recognition module 1171 and the functional key 1172 are not protruding from the first surface 101. As such, when the second body 120 slides relative to the first body 110, the fingerprint recognition module 1171 and the function key 1172 will not block the sliding of the second body 120. It can be understood that all of the functional keys for the operation of the mobile terminal 100 can be set on the first extension 114 to avoid setting the functional keys in the second body 120, thereby providing more space for the display of the second body 120 to achieve a higher screen-to-body ratio.

In the illustrated embodiment, the first body 110 may further include a second functional component 118 disposed on the second extension 116. The second functional component 118 may include at least one of a camera and a receiver for example. For example, the second functional component 118 may include a first camera 1181. The image capturing portion (camera lens) of the first camera 1181 is exposed from the first surface 101 of the first body 110 at the second extension 114, and the first camera 1181 can be used as a front-facing camera for image capturing when taking a picture, especially when taking a selfie.

In the illustrated embodiment, the image capturing portion of the first camera 1181 is not protruded from the first surface 101. Thus, when the second body 120 slides relative to the first body 110, the first camera 1181 will not block the sliding of the second body 120. It can be understood that the camera for photographing of the mobile terminal 100, especially the first camera 1181 for front shooting, being disposed on the second extension 116, can avoid setting the functional component such as the camera and/or the receiver on the second body 120, thereby further providing more space for the display of the second body 120 to achieve a higher screen-to-body ratio.

In addition, referring to FIG. 3, the second functional component 118 may further include a second camera 1183. The second camera 1183 is disposed on the second surface 102 of the first body 110 at the second extension 116. The second camera 1183 can be used as a rear camera for image capture during shooting.

In the alternative embodiments, the mobile terminal 100 may further include a face recognition module 1184 or an iris recognition module 1185 disposed on the second extension 116. The face recognition module 1184 or the iris recognition module 1185 can be connected to the first camera 1181 or the second camera 1183. The first camera 1181 or the second camera 1183 can be used to tack pictures.

Referring to FIG. 1 and FIG. 4 again, the second body 120 is mainly configured to carry components of the mobile terminal 100, such as a display screen. The second body 120 and the first body 110 are electrically connected through a flexible circuit board. The second body 120 may have a front surface 121 and a rear surface 122, and the front surface 121 and the rear surface 122 are respectively disposed on opposite sides of the second body 120. The front surface 121 of the second body 120 is disposed on the side of the second body 120 facing away from the first body 110. The rear surface 122 of the second body 120 is opposite to the first surface 101 of the first body 110. The second body 120 may include a display screen 123, and the display screen 123 is set on the front surface 121.

Figure 4:
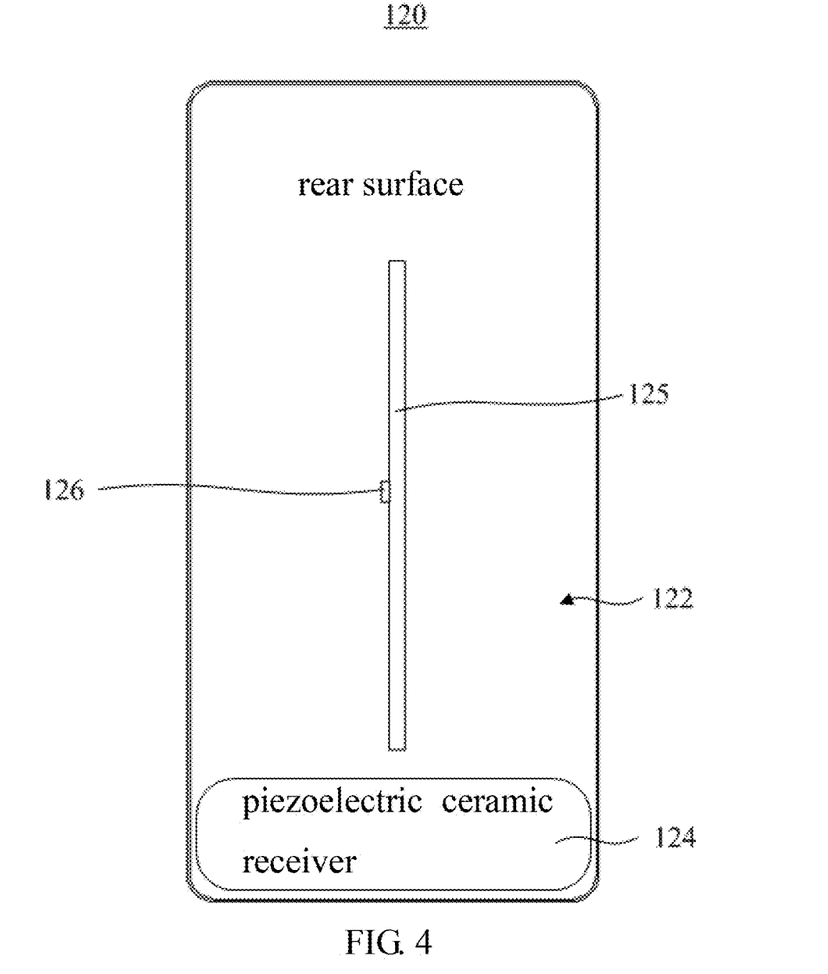
FIG. 4 is a schematic structural diagram of a view on a side of a rear surface of the second body of the mobile terminal in accordance with one embodiment of the present disclosure.

In the illustrated embodiment, the functional keys for the operation of the mobile terminal 100 can be set on the first extension 114 of the first body 110. The camera and the receiver of the mobile terminal 100, in particular the first camera 1181 for front shooting, are set on the second extension 116 of the first body 110. The display screen 123 may have a larger size to increase the screen-to-body ratio (the area ratio of the display area of display screen 123 to the front surface 121), thereby realizing the full screen design. The full screen design means that the screen-to-body ratio of the mobile terminal is greater than or equal to a preset value, that is, the screen-to-body ratio of the display area of the display screen 123 to the front surface 121 is greater than or equal to the preset value. In some embodiments, the preset value of the screen-to-body ratio of the full screen design may be 70% to 100%. Further, the preset value of the screen-to-body ratio of the full screen design can be 90%.

In some embodiments, the front surface of the full screen mobile terminal can be provided with three or fewer physical keys, and the front surface of the full screen mobile terminal can also be provided with two or fewer openings to simplify the structure of the full screen mobile terminal.

In addition, in order to further increase the screen-to-body ratio of the mobile terminal 100, the mobile terminal 100 of the illustrated embodiment may further include a piezoelectric ceramic receiver 124 (shown in FIG. 4). The piezoelectric ceramic receiver 124 is disposed on the rear surface 122 of the second body 120. The piezoelectric ceramic receiver 124 performs electroacoustic conversion by means of a piezoelectric ceramic material to realize the function of the receiver. Using the piezoelectric ceramic receiver 124 can avoid opening the corresponding sound hole of the receiver on the front surface 121 of the second body 120, thereby increasing the screen-to-body ratio of the mobile terminal 100. In addition, the sensor of the mobile terminal 100, such as the light sensor, may be set in a manner as close as possible to the edge of the second body 120 or hidden in the display screen 123 to achieve the full screen display of the mobile terminal 100.

The second body 120 of the mobile terminal 100 of the illustrated embodiment is slidably coupled to the first body 110 and may be stacked on the first body 110 for selectively slide to a first position, a second position, or a third position.

Figure 5:
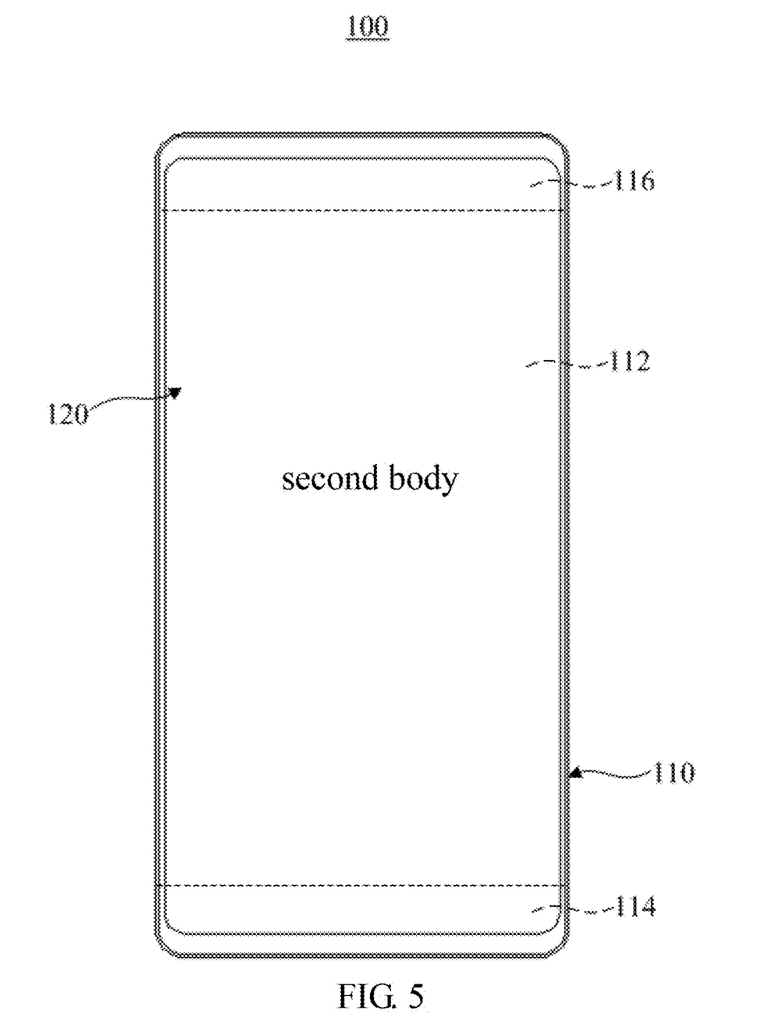
FIG. 5 is a schematic structural diagram of the mobile terminal at the first position in accordance with one embodiment of the present disclosure.

FIG. 5 is a schematic diagram showing the structure of the second body 120 of the mobile terminal 100 at the first position. Referring to FIG. 2 and FIG. 5, when the second body 120 is at the first position, the second body 120 covers the main body portion 112, the first extension 114, and the second extension 116. In this condition, the first functional component 117 disposed on the first extension 114 and the second functional component 118 disposed on the second extension 116 are both covered by the second body 120. When the mobile terminal 100 is in this state, the mode thereof is a normal mode. In the normal mode, the mobile terminal can make a call, access the Internet, play a game, and take a photo with the second camera 1183.

Figure 6:
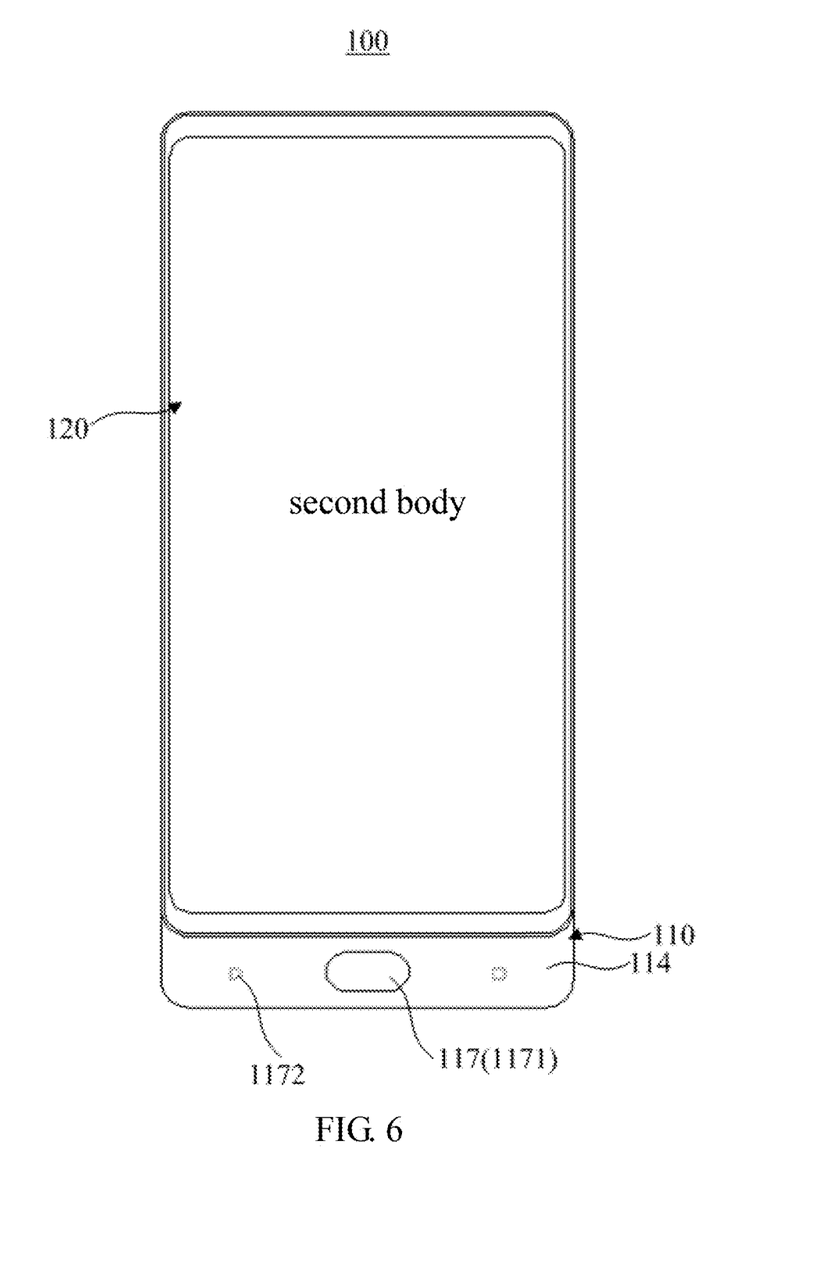
FIG. 6 is a schematic structural diagram of the mobile terminal at the second position in accordance with one embodiment of the present disclosure.

FIG. 6 is a schematic diagram showing the structure of the second body 120 of the mobile terminal 100 at the second position. Referring to FIG. 2 and FIG. 6, when the second body 120 continues to slide from the first extension 114 to the second extension 116 relative to the first body 110, the position of the second body 120 changes from the first position to the second position and stayed at the second position. When the second body 120 is at the second position, the main body portion 112 and the second extension 116 are covered and the first extension 114 is exposed. In this condition, the first functional component 117 disposed on the first extension 114 is exposed because it is not covered by the second body 120, and the second functional component 118 disposed on the second extension 116 is covered by the second body 120. When the mobile terminal 100 is in this state, the mode thereof is a functional key operation mode. In the functional key operation mode, an operation requiring fingerprint collection and recognition such as unlocking or fingerprint payment can be accomplished by using the exposed first functional component 117 such as fingerprint recognition module 1171, or using the exposed function key 1172 (return key or menu button, etc.) to perform the corresponding operation.

Figure 7:
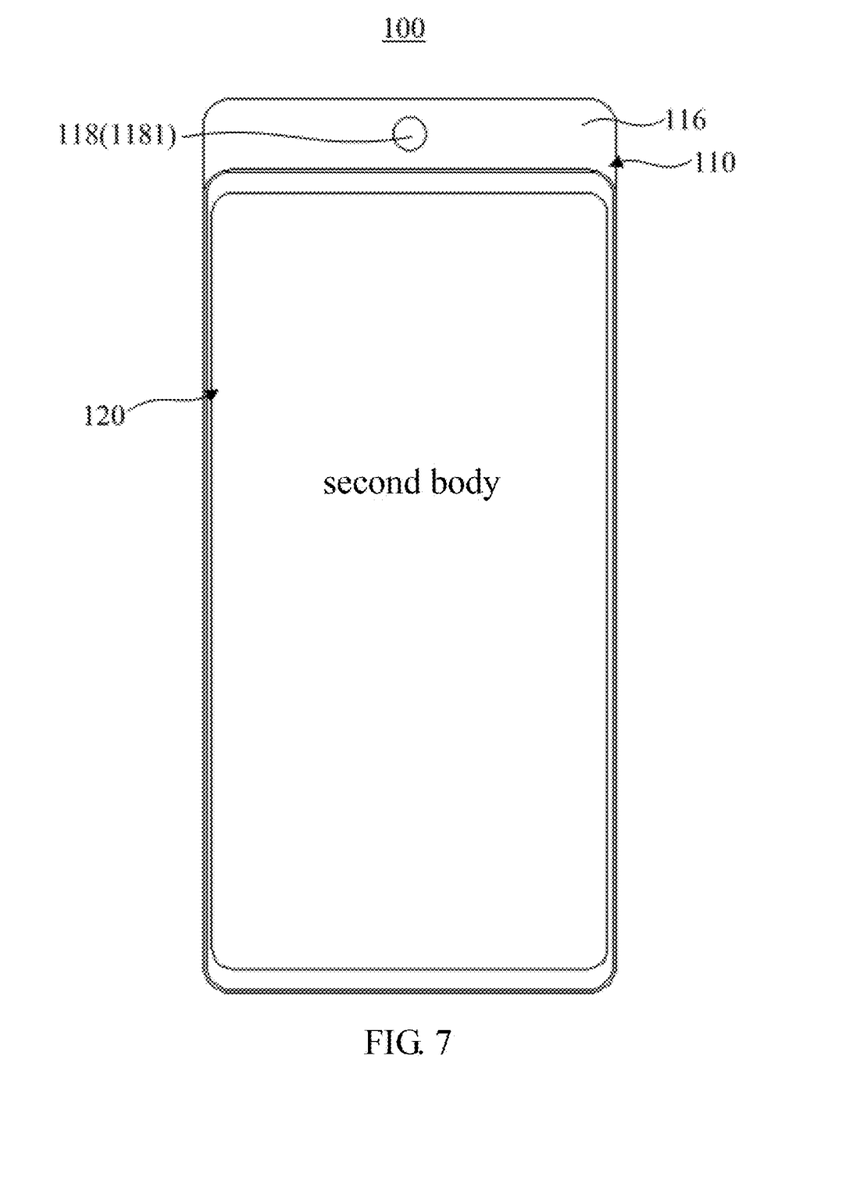
FIG. 7 is a schematic structural diagram of the mobile terminal at the third position in accordance with one embodiment of the present disclosure.

FIG. 7 is a schematic structural diagram of the second body 120 of the mobile terminal 100 at the third position. Referring to FIG. 2 and FIG. 7, when the second body 120 slides from the second extension 116 to the first extension 114 relative to the first body 110, the position of the second body 120 changes from the first position to the third position and stayed in the third position. Of course, it can be understood that the second body 120 can also be directly slid from the second position to the third position. When the second body 120 is at the third position, the main body portion 112 and the first extension 114 are covered, and the second extension 116 is exposed. In this condition, the second functional component 118 disposed on the second extension 116 is exposed because it is not covered by the second body 120, and the first functional component 117 disposed on the first extension 114 is covered by the second body 120. When the mobile terminal 100 is in this state, the mode thereof is a self-portrait mode. In the self-portrait mode, an operation such as self-photographing by the exposed first camera 1181 can be accomplished. In the illustrated embodiment, when the receiver is disposed on the second extension 116 of the first body 110, an operation such as answering a call may be performed when the second body 120 is at the third position.

It can be understood that, as described above, in the present embodiment, when the second body 120 is at the first position, the positioning block 126 cooperates with the first positioning portion 1151 to position the second body 120. When the second body 120 is at the second position, the positioning block 126 cooperates with the third positioning portion 1153 to position the second body 120. When the second body 120 is at the third position, the positioning block 126 cooperates with the second positioning portion 1152 to position the second body 120. Moreover, the manner of positioning and fixing is not limited to the embodiment, and other suitable positioning and fixing methods can also be applied thereto.

In the alternative embodiments, the second body 120 may not be slid to the second position, for example, the second body 120 may be selectively slid to the first position or the third position. Accordingly, the first extension 114 of the first body 110 may not have the first functional component 117. The second body 120 slides from the second extension 116 to the first extension 114 relative to the first body 110, exposing the second functional component 118 such as a camera and/or a receiver.

In the alternative embodiments, the second extension 116 may not have the second functional component 118, but only a portion of the first functional component 117, such as the fingerprint recognition module and/or a shortcut function key, etc., disposed on the first extension 114. For example, the second body 120 may be selectively slid between the first position and the second position. Of course, the second body 120 can still be selectively slid to the first position, the second position or third position. The first functional component 117 can be disposed on the first extension 114, and the second functional component 118 can by disposed on the second extension 116 of the first body 110. The second body 120 can reduce the arrangement of the functional components, increase the arrangement size of the display screen 123, thereby improving the screen-to-body ratio of the mobile terminal 100, and even achieving a full screen design. Moreover, the mobile terminal 100 provided by the embodiment utilize the second body 120 to be slidably stacked on the first body 110 and be selectively slid at the first position, the second position or the third position, the first functional component 117 and the second functional component 118 can be selected conveniently according to the user's requirements. Therefore, the screen-to-body ratio of the mobile terminal can be increased without affecting the normal use of other functions, that helps improve the user experience.

Figure 8:
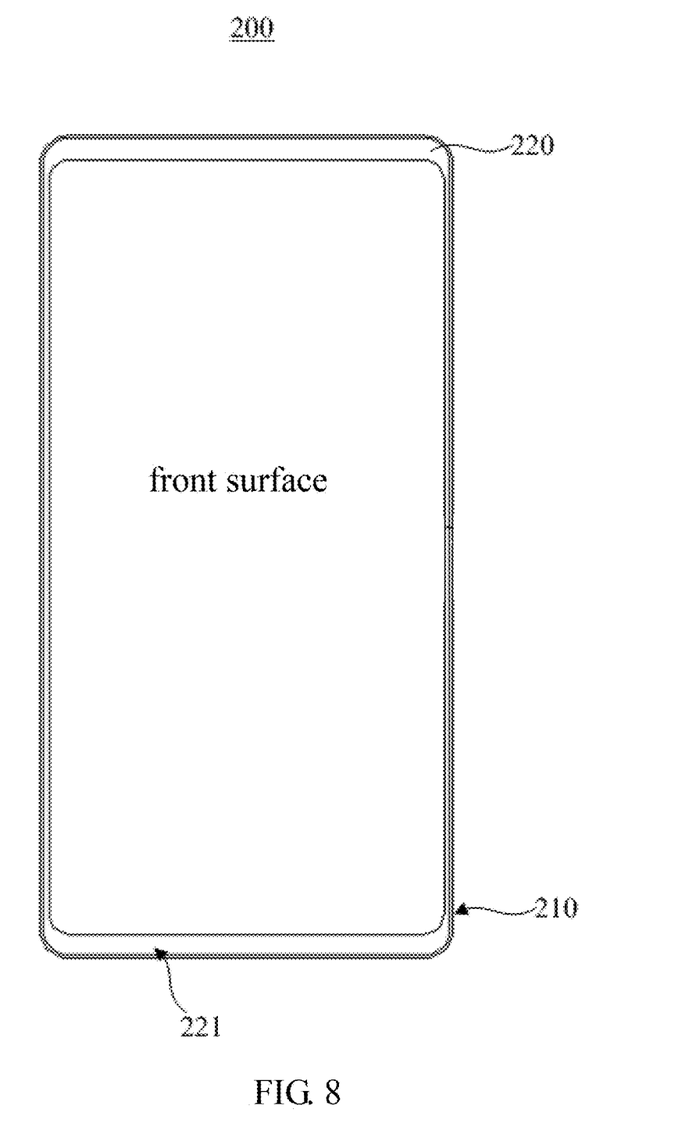
FIG. 8 is a schematic structural diagram of a view on a side of the second body of the mobile terminal in accordance with another embodiment of the present disclosure.
Figure 9:
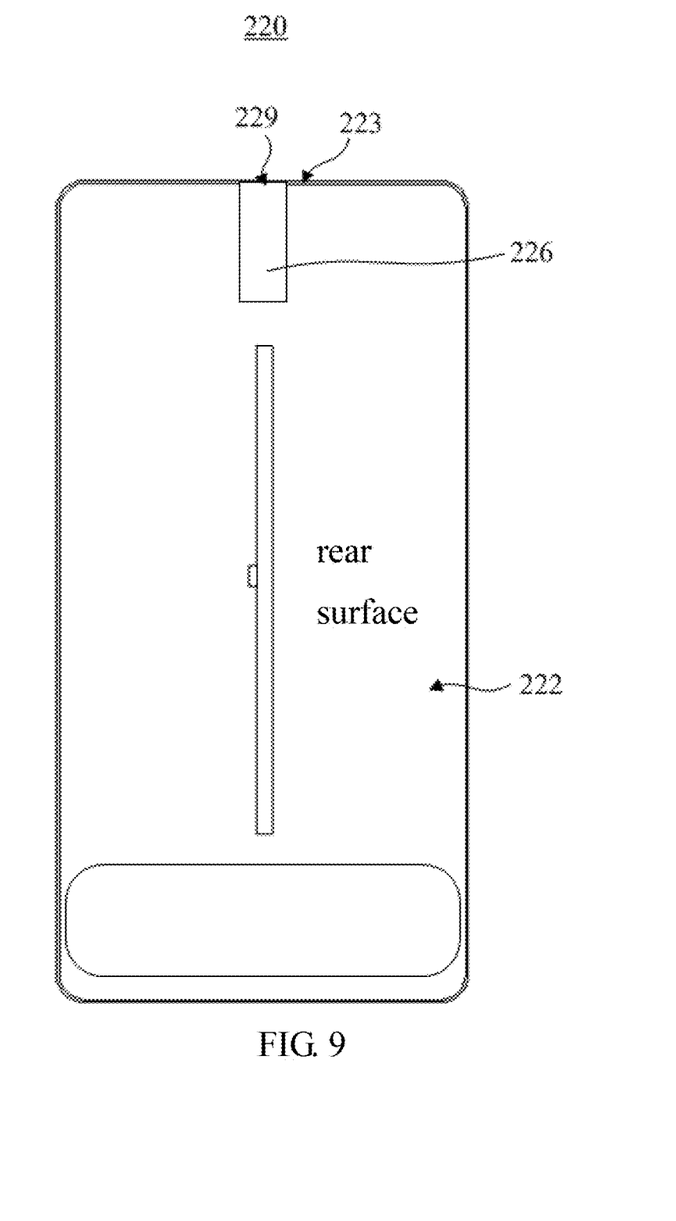
FIG. 9 is a schematic structural diagram of a view on a side of the rear surface of the second body of the mobile terminal in accordance with another embodiment of the present disclosure.
Figure 10:
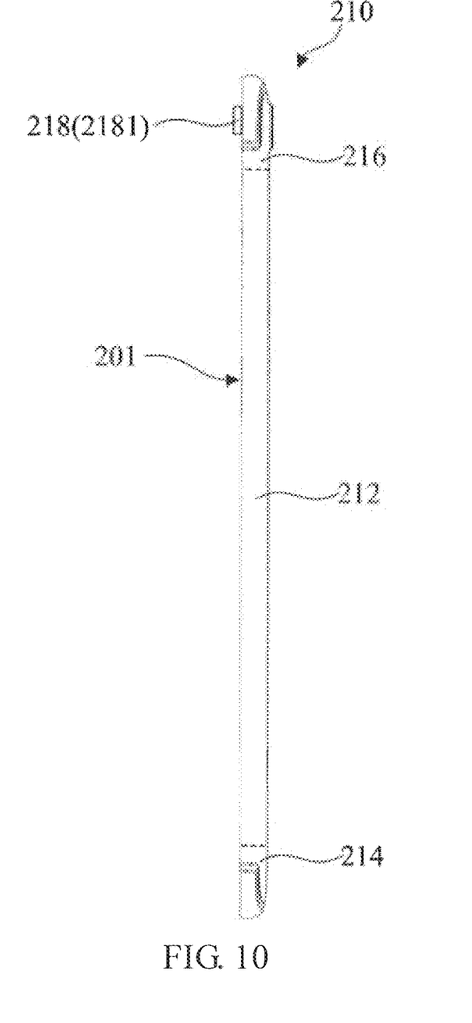
FIG. 10 is a schematic structural diagram of a side surface of the first body of the mobile terminal in accordance with another embodiment of the present disclosure.

Referring to FIGS. 8-10, a mobile terminal 200 may include a first body 210 and a second body 220. The second body 220 is slidably coupled to the first body 210. The structure of the mobile terminal 200 of the present embodiment is substantially the same as the structure of the mobile terminal 100 of the embodiment described above, and for the structure not specifically mentioned, reference may be made to the related description of the embodiment described above.

In the illustrated embodiment, as shown in FIG. 10, the first camera 2181 disposed on the second extension 216 of the first body 210 protrudes from the first surface 201. The second body 220 has a front surface 221 (refer to FIG. 8) and a rear surface 222 (refer to FIG. 9), and a side surface 223 connected between the front surface 221 and the rear surface 222. The side surface 223 is the side surface near the side of the second extension 216. The rear surface 222 is opposite to the first surface 201 of the first body 210.

The rear surface 222 defines a groove 226 thereon and the groove 226 penetrates the side surface 223. An opening 229 is defined at the side surface 223 thereby. The longitudinal direction of the groove 226 extends in a direction parallel to the sliding direction of the second body 220 relative to the first body 210, that is, parallel to the longitudinal direction of the main body portion 212 of the first body 210. A portion of the first camera 2181 protruding from the first surface 201 is disposed in the groove 226. When the second body 120 slides toward the first extension 214 relative to the first body 210 and the second body 220 reaches the third position, the first camera 2181 slides along the groove 226 and slides out of the opening 229 at the side surface 223. In this condition, the second functional component 218 (e.g., the first camera 2181) disposed on the second extension 216 is not covered by the second body 220. The mobile terminal 200 is in a self-portrait mode, and for example, an operation such as a self-photograph can be performed using the first camera 2181 exposed therefrom.

In the illustrated embodiment, the first camera 2181 can be protruded from the first body 210, and the first camera 2181 is better protected and hidden by cooperating with the recess 226, which is defined in the rear surface 222 of the second body 220. When using the first camera 2181, the second body 220 slides relative to the first body 210 and the first camera 2181 is exposed from the corresponding groove 226. As such, the first camera 2181 will not be limited by the set position, for example, there may be more choices in terms of pixels and focal length, thereby presenting a better self-portrait effect.

Furthermore, the second body 220 of the mobile terminal 200 of the present embodiment can reduce the arrangement of the functional components, increase the size of the display screen 223, thereby increasing the screen-to-body ratio of the mobile terminal 200 (the area ratio of the display area of the display screen 223 to the front surface 221), and even achieving a full screen design. The full screen design means that the screen-to-body ratio of the mobile terminal is greater than or equal to a preset value, that is, the area ratio of the display area of the display screen 123 to the front surface 121 is greater than or equal to the preset value. In some embodiments, the preset value of the screen-to-body ratio of the full screen design may be 79% to 100%. Further, the preset value of the screen-to-body ratio of the full screen design can be 90%. In some embodiments, the front surface of the full screen mobile terminal can be provided with three or fewer physical keys, or/and the front surface of the full screen mobile terminal can be provided with two or fewer openings to simplify the structure of the full screen mobile terminal. Moreover, the mobile terminal 200 provided by the embodiment utilize the second body 220 to be slidably stacked on the first body 210 and be selectively slid at the first position, the second position or the third position, the functional component to operate can be selected conveniently according to the user's requirements conveniently. Therefore, the screen-to-body ratio of the mobile terminal can be increased without affecting the normal use of other functions, that helps improve the user experience.

The above-mentioned embodiments are merely illustrative of several embodiments of the present disclosure, and the description thereof is more specific and detailed, but is not to be construed as limiting the scope of the claims. It should be noted that a number of variations and modifications may be made by those skilled in the art without departing from the spirit and scope of the present disclosure. Therefore, the scope of protection of the disclosure should be determined by the appended claims.

What is claimed is:

1. A mobile terminal, comprising:
a first body, comprising a main body portion, a first extension, a second extension, a first functional component and a second functional component, the main body portion being connected between the first extension and the second extension, the first functional component being disposed on the first extension, and the second functional component being disposed on the second extension; and
a second body, being slidably stacked on the first body and selectively sliding to a first position, a second position, or a third position, wherein when the second body is at the first position, the second body covers the main body portion, the first functional component and the second functional component, when the second body is at the second position, the first functional component is exposed, when the second body is at the third position, the second functional component is exposed;
wherein the first body comprises a first surface, the second functional component comprises a first camera; the second body comprises a front surface facing away from the first body, a rear surface opposite to the first surface, and a side surface adjacent to the second extension, the second body defines a groove exposed from the rear surface and the side surface, a longitudinal direction of the groove is parallel to a sliding direction of the second body, a portion of the first camera protruding from the first surface is disposed in the groove, when the second body slides relative to the first body and reaches the third position, the first camera slides along and out of the groove, thereby being exposed;
wherein the first body defines a sliding slot, a first positioning slot, a second positioning slot, and a third positioning slot in the first surface, the first positioning slot, the second positioning slot, and the third positioning slot are communicated with the sliding slot the second body comprises a positioning protrusion cooperating with the sliding slot and a positioning block disposed on the positioning protrusion, the positioning block selectively engages with one of the first positioning slot, the second positioning slot, and the third positioning slot when the second body slides to one of the first position, the second position, and the third position, and the positioning protrusion is disposed on the rear surface.

2. The mobile terminal as claimed in claim 1, wherein the positioning block is an elastic protruded column.

3. The mobile terminal as claimed in claim 2, wherein the first positioning slot, the second positioning slot, and the third positioning slot are sequentially arranged along the sliding direction of the second body.

4. The mobile terminal as claimed in claim 2, wherein the first positioning slot is defined in the middle of the mobile terminal, the second positioning slot and the third positioning slot are defined on both sides of the first positioning slot, the second positioning slot is closer to the first extension than the third positioning slot, the distance between the first positioning slot and the second positioning slot is equal to the distance that the second body slides from the second extension to the first extension relative to the first body, the distance between the first positioning slot and the third positioning slot is equal to the distance that the second body slides from the first extension to the second extension relative to the first body.

5. The mobile terminal as claimed in claim 1, wherein the side surface is connected between the front surface and the rear surface.

6. The mobile terminal as claimed in claim 1, wherein the second functional component further comprises a second camera, the first body further comprises a second surface, the second surface and the first surface are respectively located on two opposite sides of the first body, and the second camera is disposed on the second surface.

7. The mobile terminal as claimed in claim 1, wherein the mobile terminal further comprises a piezoelectric ceramic receiver, and the piezoelectric ceramic receiver is disposed on the rear surface.

8. The mobile terminal as claimed in claim 1, wherein the first functional component comprises a fingerprint recognition module.

9. The mobile terminal as claimed in claim 1, wherein the mobile terminal further comprises a face recognition module, and the face recognition module is disposed on the second extension.

10. The mobile terminal as claimed in claim 1, wherein the mobile terminal further comprises an iris recognition module, and the iris recognition module is disposed on the second extension.

11. The mobile terminal as claimed in claim 1, wherein the second body further comprises a display screen, the display screen is disposed on the front surface.

12. The mobile terminal as claimed in claim 11, wherein an area ratio of a display area of the display screen to the front surface is greater than 90%.

13. The mobile terminal as claimed in claim 1, wherein the first body further comprises functional keys disposed at the first extension, and the functional keys are not protruding from the first surface.

14. The mobile terminal as claimed in claim 1, wherein the second functional component further comprises a receiver.

15. A mobile terminal, comprising:
a first body, comprising a main body portion, a first extension, a second extension and a functional component, the main body portion being connected between the first extension and the second extension, and the functional component is disposed on the second extension, the functional component comprising at least one of a camera and a receiver; and
a second body, slidably stacked on the first body, and after the second body sliding relative to the first body along a sliding direction from the second extension to the first extension, the functional component being exposed, meanwhile, the main body portion and the first extension being covered;
wherein the first body comprises a first surface, the second body comprises a front surface, a rear surface, and a side surface, the front surface faces away from the first body, the rear surface is opposite to the first surface, the side surface is adjacent to the second extension and is connected between the front surface and the rear surface, the second body defines a groove in the rear surface, the groove passes through the side surface thereby defining an opening at the side surface, a longitudinal direction of the groove is parallel to the sliding direction of the second body, a portion of the camera protruding from the first surface is disposed in the groove, when the second body slides along the sliding direction from the second extension to the first extension, the camera slides along the groove and slides out of the opening;
wherein the first body defines a sliding slot, a first positioning slot, a second positioning slot, and a third positioning slot, the first positioning slot, the second positioning slot, and the third positioning slot are communicated with the sliding slot the second body comprises a positioning protrusion cooperating with the sliding slot and a positioning block disposed on the positioning protrusion, the positioning block selectively engages with one of the first positioning slot, the second positioning slot, and the third positioning slot.

16. The mobile terminal as claimed in claim 15, wherein the mobile terminal further comprises a fingerprint recognition module disposed on the first extension.

17. The mobile terminal as claimed in claim 15, wherein the positioning block is an elastic protruded column.

18. The mobile terminal as claimed in claim 15, wherein the mobile terminal further comprises a face recognition module disposed on the second extension.

19. A mobile terminal, comprising:
a first body, comprising a main body portion, a first extension, a second extension, a first functional component and a second functional component, the main body portion being connected between the first extension and the second extension, the first functional component being disposed on the first extension, and the second functional component being disposed on the second extension; and
a second body, being slidably stacked on the first body and selectively slide to a first position, a second position, or a third position, the second body covering the main body portion, the first functional component and the second functional component when the second body is at the first position, first functional component being exposed when the second body is at the second position, the second functional component being exposed when the second body is at the third position;
wherein the first body comprises a first surface, the second functional component comprises a first camera; the second body comprises a front surface facing away from the first body, a rear surface opposite to the first surface, and a side surface adjacent to the second extension, the second body defines a groove exposed from the rear surface and the side surface, a longitudinal direction of the groove is parallel to a sliding direction of the second body, a portion of the first camera protruding from the first surface is disposed in the groove, when the second body slides to the third position, the first camera slides along and out of the groove;

wherein the first body defines a sliding slot, a first positioning slot, a second positioning slot, and a third positioning slot, the first positioning slot, the second positioning slot, and the third positioning slot are communicated with the sliding slot;

wherein the second body comprises a positioning protrusion cooperating with the sliding slot and a positioning block disposed on the positioning protrusion, the positioning block is an elastic protruded column and selectively engages with one of the first positioning slot, the second positioning slot, and the third positioning slot when the second body slides to the first position, the second position, or the third position.

20. The mobile terminal as claimed in claim 19, wherein the first functional component comprises a fingerprint recognition module.

\* \* \* \* \*